(12) United States Patent
Braun (10) Patent No.: US 6,877,507 B2
(45) Date of Patent: Apr. 12, 2005

(54) MOUNTING

(76) Inventor: Richard Braun, PO Box 1888, Toowong QLD (AU)

( * ) Notice: Subject to any disclaimer, the term of this patent is extended or adjusted under 35 U.S.C. 154(b) by 0 days.

(21) Appl. No.: 10/312,228

(22) PCT Filed: Jun. 22, 2001

(86) PCT No.: PCT/AU01/00742

§ 371 (c)(1),
(2), (4) Date: Jun. 30, 2003

(87) PCT Pub. No.: WO02/01119

PCT Pub. Date: Jan. 3, 2002

(65) Prior Publication Data

US 2004/0027310 A1 Feb. 12, 2004

(30) Foreign Application Priority Data

Jun. 23, 2000 (AU) .................................................. 8375

(51) Int. Cl.[7] .................................................. F24J 2/00
(52) U.S. Cl. ........................ 126/606; 126/652; 126/684; 126/696
(58) Field of Search ................................. 126/565–568, 126/690–700, 705–708, 684, 688, 600, 652, 605–607; 136/246, 248

(56) References Cited

U.S. PATENT DOCUMENTS

| | | | | | |
|---|---|---|---|---|---|
| 4,136,674 | A | * | 1/1979 | Korr | 126/607 |
| 4,214,572 | A | * | 7/1980 | Gonder | 126/577 |
| 4,442,348 | A | * | 4/1984 | Snyder | 250/203.4 |
| 4,771,764 | A | * | 9/1988 | Cluff | 126/577 |
| 5,445,177 | A | * | 8/1995 | Laing et al. | 136/246 |

FOREIGN PATENT DOCUMENTS

| | | | |
|---|---|---|---|
| DE | 2714850 | * | 10/1978 |
| DE | 2755722 | * | 6/1979 |
| FR | 2471564 | * | 6/1981 |

* cited by examiner

Primary Examiner—James C. Yeung
(74) Attorney, Agent, or Firm—Laura G. Barrow (57) ABSTRACT

Novel mounting devices for attachment to an apparatus, the apparatus configured to receive and/or transmit radiation flux (e.g. satellite dishes for communications or electromagnetic power focusing) are described and claimed herein. The inventive mounting devices are configured to allow rotational movement of the apparatus at a required position.

50 Claims, 8 Drawing Sheets

MOUNTING

THIS INVENTION relates to a device for the restraining and movement of an apparatus. In particular, but in no way limiting, it is directed to a device which finds application in the simultaneous restraining but allowing rotational movement of an apparatus for the collection and concentration of radiation flux throughout the entire electromagnetic spectrum. Where that radiation flux is solar flux, thermal power outputs of 2.2 MW and beyond should be possible.

Rotatable and steerable dishes have a range of uses including: as satellite dishes for communications, for electromagnetic power focussing and as solar flux collectors. It is desirable that such motile receiving dishes be as large as possible, primarily because of the weak strength of the flux being collected. In respect of solar collectors, these have effectively been large sails. Further, for accurate and efficient receipt of the incoming flux, these dishes must also be rigid which thus usually requires the use of various bracing structures to prevent distortion of the dishes due to wind forces, etc. Consequently, with such robust constructions, powerful and accurate drive systems are also required. The resultant assemblies, particularly these naked mirror solar collectors, can thus be massive and expensive to construct. Another disadvantage is that space satellite dish reflectors for communications, electromagnetic power focussing or solar flux concentration have failed to deploy correctly due to the complex construction necessary to meet these demands of rigidity. Yet another disadvantage is that these dishes, irrespective of use but particularly when used as a solar collector, also require regular cleaning of the exterior surfaces for maximum efficiency. This is currently a manual process which thus adds to the maintenance costs of such dishes.

For those applications where it is not necessary to have the dish directly exposed, prior art solutions to the above problems include the use of fixed domes to protect the dishes. However, this is not practical for a solar flux collector and, consequently, the mirror assembly of such solar dishes must be even more robust to prevent damage from, for example, hail.

It is thus a general object of the present invention to overcome, or at least ameliorate, one or more of the above disadvantages.

According to a first aspect of the present invention, there is provided a device for the simultaneous restraining but allowing continuous unrestricted rotational movement of an apparatus of the type for receiving and/or transmitting radiation flux, said device including:
- a fluid-impermeable shell adapted to support said apparatus;
- a restraining means to restrain said shell at a required position; and
- a support means to buoyantly support said shell, said support means adapted to allow continuous movement of said shell along at least one non-vertical axis;
- wherein said restraining means and said support means are adapted to allow said rotational movement of said shell at said required position.

Said apparatus may be selected from one or more of the following:
I a transmitting/receiving apparatus;
II a reflecting apparatus;
III a lensing apparatus; and
IV a gas or liquid, to be used for lensing electromagnetic radiation, or chemical production.

Said shell may be spherical, spheroid, cylindrical, or cylindroid in shape.

Said shell may be transparent.

Said shell may be hollow.

In those embodiments where said shell is hollow, said shell may be pressurised, whereby the internal pressure may be maintained using one or more of the following means:
I an external gas supply and pressure control;
II gas-release vents, which are activated when said internal pressure exceeds the external pressure by an amount which exceeds some specified threshold;
III chemical compounds present internal of said shell which exhibit desired partial pressures; and
IV gas containers positioned internal of said shell, which release gas when said internal pressure drops below a fixed threshold.

Said shell may be restrained laterally and vertically by said restraining means.

Said restraining means may restrain said shell vertically by ballast held internally of said shell.

Said ballast may be either a liquid or particulate matter.

When said ballast is a liquid, said liquid may further include a bacteriostatic and/or anti-fogging agent.

When said ballast is particulate matter, said particulate matter may be a vibrating resonance-fluidised bed.

Said support means may be either a liquid or particulate matter.

When said support means is particulate matter, said particulate matter may be a vibrating resonance-fluidised bed.

Said support means may include a collar assembly surrounding the lower portion of said shell, said collar assembly retaining said liquid or said particulate matter of said support means.

Said collar assembly may include one or more toroids of rigid or flexible construction.

When said toroids are of a flexible construction, the rigidity necessary for their use may be achieved by:
[a] inflating with a gas to a sufficient pressure to resist compression by said shell in a given environment; or
[b] filling with a liquid and, optionally, further increasing rigidity by supplying said toroids with an elevated pressure head.

Optionally, to reduce frictional contact forces between said shell and said collar assembly, low friction materials may be used for the manufacture of said collar assembly in the contact area with said shell. Alternatively, jets of fluid, or permeable membranes through which fluid is forced, may be operated within said contact area to provide a film of fluid between said shell and said collar assembly.

When said jets of fluid or permeable membranes through which fluid is forced are used, said fluid may be directed to clean the exterior surface of said shell.

Optionally, said collar assembly may be reinforced against lateral displacement. Said lateral displacement may be prevented by the use of wedges. Said wedges may be made of a rigid or semi-rigid material. A suitable semi-rigid material is a rubber tyre a multiple of which may surround said collar assembly.

In those embodiments of the present invention which include said collar assembly and wherein said shell contains said ballast held internally, vertical restraint of said shell can be particularly readily maintained.

Although not wishing to be bound by theory, the vertical stability of floating bodies of any size or shape when they float in an enclosing container which is in close proximity to the floating body near the surface of the liquid or particulate bed which constitutes the supporting medium can be controlled under the influence of externally applied loads with a net vertical component. The method is to select the geometry and proximity to the floating body of the enclosing region for a given floating body such that an important physical effect becomes significant, and enhances the desired vertical stabilization. The effect, and the method for selecting the optimal geometry, is described as follows.

When an object floating in a liquid confined within a container is subjected to a vertical force, the object is displaced vertically from its equilibrium position by a given distance and the supporting liquid will be displaced in the opposite direction. The degree of the displacement varies with the applied force according to the relative changes in submersed volume from small increments or decrements in the vertical position of the floating object. The effect means that the position of the object will experience smaller vertical displacements for a given vertical force than it would if it were placed in a much larger open body of water. A simple example is a ship in the ocean—the ocean does not significantly drop in level when the ship is elevated.

The effect is maximized by reducing the volume of the supporting fluid for the range of vertical displacements for a given floating object. The effect becomes significant when the periphery of the enclosing container is placed in close proximity to the floating body. Within the desired range of displacements, the degree of displacement which results from the application of an external force is controlled by varying the ratio of the cross-sectional areas of the floating body and of the fluid surrounding that body at the height of the external supporting fluid or particulate bed.

Adapting the above to the relevant embodiments of the present invention, the general method is to analyse the elements of incremental motion over the entire range of desired displacements for the known range of vertical loads which will act on said shell, and to select the geometry of said restraining means and said support means such that the desired relationship between vertical displacement and vertical force is obtained, over the desired range of vertical displacement of said shell.

Said radiation flux may be collected by a receiver assembly positioned internally or externally of said shell.

When said receiver assembly is positioned internally, said receiver assembly may be fixed or motile.

Said receiver assembly may be supported by said shell.

Said receiver assembly may also include a concentrator for said radiation flux, whereby said radiation flux may be focussed externally, peripherally or internally of said shell.

When said concentrator is mounted internally of said shell, said concentrator may be a metallized or generally reflective plastic surface attached to the interior of said shell.

When said ballast held internally of said shell is present, said concentrator may include apertures therein sufficient for said ballast to pass through as said device moves.

In those embodiments of the present invention wherein said apparatus is a said reflecting apparatus, said reflecting apparatus may include a thin membrane reflective mirror (having a planar surface distorted sufficiently to obtain the necessary focal length curvature) associated with a reflector.

The shape of said membrane may be pre-formed by methods which include:
I the application of thermal heat or electromagnetic radiation to selected regions of a flat plane to obtain varying degrees of surface curvature across a membrane;
II a flat membrane may be selectively cut and re-sealed or re-welded after the cut has been made at various locations on the membrane to achieve a non-linear curved surface;
III elastomeric gores may be inserted into a membrane surface to permit the surface attributes and geometry to change under the effect of varying the differential pressure acting across the membrane; and
IV pinch-folds may be made, and the material joined by heat, glue or staples to maintain those folds, thereby creating a non-Euclidean surface.

Said reflector may be one of the following:
[a] a reduced-pressure plenum of two membranes being peripherally conjoined and mounted in a full spheroidal said shell, the anterior membrane being mirrored, the posterior membrane being connected centrally via a radial tensor attached to the inner surface of said shell, or to some other suitable attachment point within said shell; the posterior membrane is thus pulled away from the anterior causing a small pressure reduction in the Γ suiting plenum sufficient to remove wrinkles in said reflector; an external connection may be used to adjust the reduced pressure; the membranes may be mounted on a ring which is attached to said shell, thus reducing the stresses on the membranes;
[b] an increased-pressure plenum of two circular membranes being peripherally conjoined and attached internally to said shell, the anterior membrane being transparent to the radiation frequency and of any shape, and the posterior membrane being bias-cut and mirrored; the plenum pressure may be adjusted via an external connection or maintained by the use of compounds exhibiting appropriate partial pressures;
[c] a thin-mirrored membrane hermetically dividing said shell permitting a pressure differential to be maintained by the use of a gas or compounds exhibiting appropriate partial pressures; the pressure need not be sufficient to create the curvature of the membrane, but merely to prevent wrinkling of the mirror.

Said rotational movement of said device may be undertaken by a number of steering methods which include:
[a] an altitude/azimuth/Equation of Time solar flux concentration algorithm (designed to orient said concentrator to focus said flux onto said receiver assembly) interpreted to:
I external tethers;
II winches;
III jackscrews;
IV motile cups (suction or forced contact) or indentation pads (which may or may not be moved tangentially to the surface of said shell if desired), whose degree of contact with said shell may be varied if desired;
V paddles or cylinders which are in contact with said shell for all or part of their range of rotation angles, and which may exhibit varying coefficients of friction around their surface, such that motion is uninhibited by friction for some orientations of the paddles or cylinders, but not for the orientations of the paddles or cylinders which are involved during active rotation of said shell;
VI the paddles or cylinders may also exhibit belts on their surface which are free to rotate in one or more directions, thereby reducing friction on said shell; the paddles or cylinders may also incorporate one or more arrays of one or more rollers which are in contact with said shell for some orientations of the paddles or cylinders, thereby forming a means of reducing friction on said shell; the paddles or cylinders are mounted in contact with said shell;

VII frictional drive, in which one or more bodies are in frictional contact with said shell to cause motion, may exhibit variations in the coefficient of friction around their surface which are to be used to vary the force acting between said shell and the bodies.

VIII an azimuthal control rod, passed through the polar axis of said shell, which is attached at both ends to an external drive and support mechanism, and whose angle of elevation may be varied by external control, and which is used to rotate said shell about the axis defined by the rod;

IX a single-end azimuthal control, in which the motion of said shell is controlled by rotation about a fixed point or circular region of contact, the position of which is controlled from an external source;

X a great-circle tracking ring or set of parallel tracking rings, attached to a great-circle ring or set of parallel rings on said shell, controlled mechanically from an external source which is free to move within said collar assembly or from any place outside said shell adjacent to it;

XI motion of devices within said shell which are in contact with said shell and which are able to exert force upon said shell by their motion within it;

XII said shell may be filled with magnetic fluid or particles, and may be oriented by linear or angular motors which rely upon magnetic interaction with the particles contained within said shell; motion may be caused by Maxwell's effect (induced currents) or by direct magnetic action; currents may be induced in an internal fluid which contains dissolved ions apart from those of the fluid itself which exist from the natural equilibrium reactions at the environmental temperature.

[b] an altitude/azimuth/Equation of Time algorithm interpreted to pressure nozzles mounted in a dished bed supporting said shell and vectored towards said shell in a contact area between said shell and said collar assembly;

[c] an altitude/azimuth/Equation of Time algorithm interpreted to moveable tractor arrays acting on the under-surface of said shell in a contact area between said shell and said collar assembly;

[d] reaction-mass thrusters for Space use;

[e] radiothermal paddles for Space use.

The tracking methods described above for said rotational movement require the determination of an algorithm for orienting a given said shell whereby it may be rotated incrementally about three orthogonal Cartesian axes. The determination is undertaken as follows. At any point in time, the orientation of said shell may differ from the desired orientation. An algorithm is used to calculate the orientation of said shell after one of six possible incremental rotations about three fixed axes is applied (involving three spatial axes, for each of which there are two possible rotation directions, making six in all). The resulting orientation of said shell is compared with the desired orientation, and the incremental rotation which minimizes the angular difference is selected. The angular difference is calculated by any suitable function of the angles which ensures rapid convergence under this algorithm. There are infinitely many such functions. Incremental rotation of said shell about the three orthogonal Cartesian axes is achieved using one of the steering methods (I–VI, X, XII). In the case of methods (III, IV, V, VI), four drive systems may be equally spaced around the base of said collar assembly, and oriented so that the direction of drive force is perpendicular to the radial line towards the centre of said collar assembly, and is in an approximately horizontal direction. If all four drive systems are directed to move in the same angular sense around said shell (i.e. opposite drives rotate in an anti-parallel sense), then said shell will rotate about the vertical axis, whereas if one pair of opposing drives is directed to rotate in a parallel sense, then said shell will rotate around the Cartesian axis parallel to the line connecting the activated pair of opposing drive systems.

In addition to Alt/Az tracking, another form of tracking is possible with the particular methods of orientation described above, and especially steering methods (VII), (VIII), and (IX). This method will be referred to as modified Right Ascension/Declination (modified RA/Dec.) tracking.

This requires the reflector plane to rotate diurnally about an arbitrary axis, which is defined by the contact points in the case of methods (VII), (VIII), and by the axis defined by the centred normal of the cross-section of said shell through the plane defined by one of the tracking rings in method (IX). The orientation of this axis may be made to vary throughout the year and throughout an individual day.

In one embodiment of the present invention therefore, when said reflector is used as a solar flux concentrator, modified RA/Dec. or Polar rotation is used: the sun is tracked with the mirror plane at a fixed angle (which depends upon the particular latitude of operation) to the axis of rotation so the solar flux enters said shell equatorially and focuses in a polar direction or a direction towards a fixed target on the ground, or towards a fixed point on said shell. Said shell is caused to rotate once in 24 hours (advanced or retarded when necessary by the Equation of Time). Seasonal sun's altitude correction by axis changes may utilize an appropriately formed incremental motor mount track, or to declination offset at the Solstices, and furthermore this incremental motor mount track may be varied throughout an individual day to compensate for any deviation in the sun's path from the simplified polar tracking algorithm, in which a fixed rotation axis is employed on any particular day.

As a second aspect of the present invention, there is provided a method for receiving and/or transmitting radiation flux, wherein said radiation flux is received and/or transmitted by a device as hereinbefore described.

A preferred embodiment of the present invention will now be described with reference to the accompanying drawings, wherein.

Figure 1:
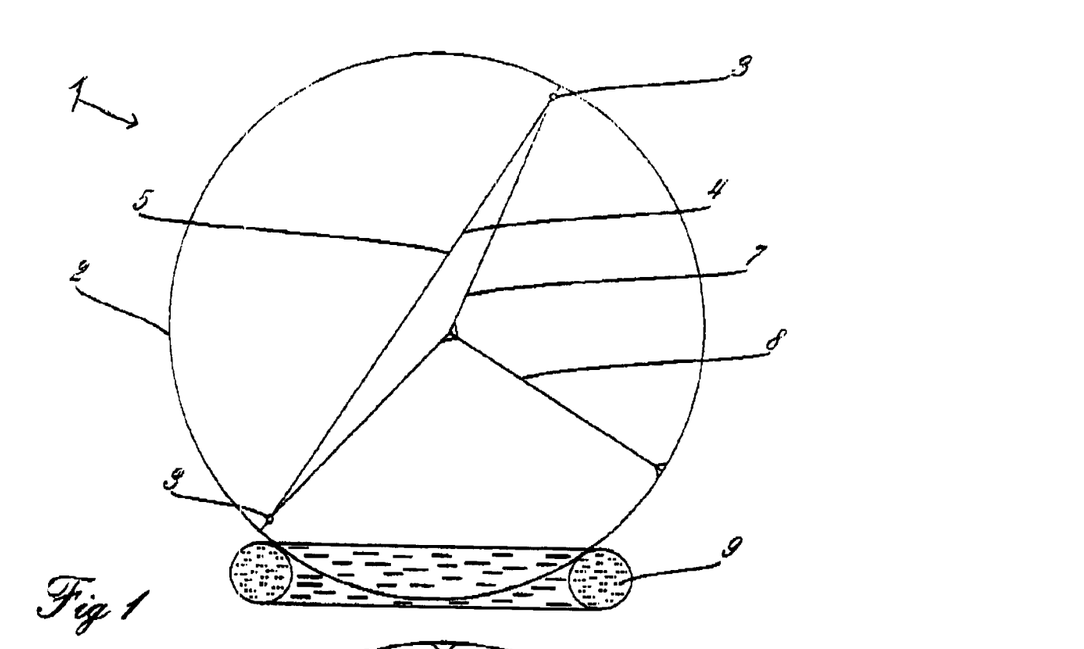
FIG. 1 is a first cross-sectional view of a device constructed in accordance with the present invention.
Figure 2:
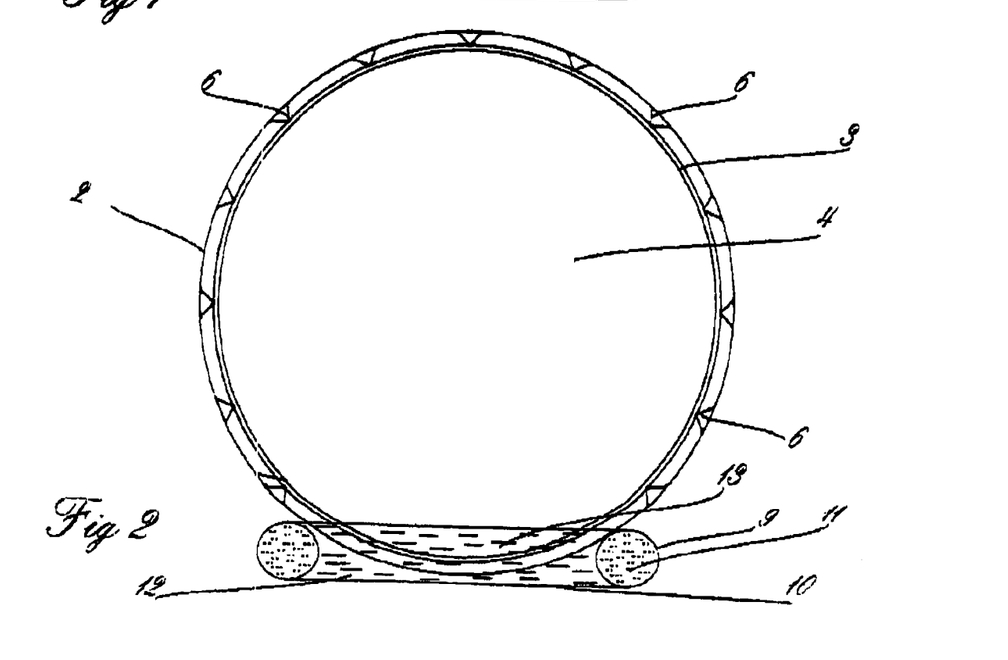
FIG. 2 is a second cross-sectional view of the device of FIG. 1, the sectional views being orthogonal to each other.

Referring to FIGS. 1 & 2, the device (1) comprises a transparent spherical shell (2), 1.5 m in diameter. The shell (2) is manufactured from a polyethylene terephthalate (PET) of approximately 0.15 mm thickness. A rigid circular rod (3) holds and frames a plastic bias-cut mirror (4) which is reflective on its upper surface (5). The rod (3) and mirror (4) assembly is attached to the inner surface of the shell (2) approximately in a plane of great circle by a series of peripheral elastic first ligaments (6). A second membrane (7) is affixed to the under surface of the mirror (4) and tethered to the inner surface of the shell (2) by a second ligament (8) in a manner to maintain a pressure differential across the two approximate hemi-spheres separated by the mirror (4) of about 0.02 atm. A quantity of water (13) is contained within the shell (2) acting as ballast. The lower portion of the shell (2) rests on a toroid (9) which, in turn is affixed to a membrane-type base (10). The toroid (9) and base (10) are also manufactured from a PET. The toroid (9) is filled with water (11). The vessel created by the inside surface of the toroid (9) and the upper surface of the base (10) also contains a quantity of water (12). The quantity of the water (12,13) is sufficient for the shell (2) to be buoyantly supported within the vessel while being lightly in contact with the toroid (9).

The device (1) functions as a solar energy collector, solar flux being reflected off the mirror (4) and directed to any suitable storage means known in the art.

The shell (2) is buoyant but restrained within the boundaries of the toroid (9) and base (10) while being free for rotational movement as required to track the sun.

Aerodynamic finite-element analysis modelling of devices constructed as above but with shell (2) of differing radii has demonstrated that currently available plastics are sufficiently strong to absorb wind-induced stresses while still providing good performance in field conditions. Typical expected thermal power outputs (operating at a 45 degree bounce angle) for differing shell (2) radii are presented in the following table.

| Shell diameter | Thermal output (kW) |
|---|---|
| 10 m | ~60 kW |
| 25 m | ~380 kW |
| 40 m | ~980 kW |
| 60 m | ~2.2 MW |

Additional features of the device as described with reference to FIGS. 1 & 2 above which are expected to be incorporated into the device include:

(a) Since the mirror (4) should be designed so that incoming rays are not focused at a point directly back towards the line of sight to the sun, but rather in a direction which makes an angle with the incoming flux (typically 40 degrees, but varying with latitude) then the mirror design must be selected to closely match an off-centre parabolic section with the average required bounce angle. In order to achieve a close approximation to this section with parallel Euclidean plastic strips, the strip design is fixed by choosing the strip centre lines to lie in planes which are radial with respect to the parabolic centre normal (i.e. the line from the parabolic focus to the parabolic base-of-bowl point). The mirror (4) would consist of 30 or more of these strips, which are sealed in an airtight fashion using adhesives.

This technique produces optimal matching between the ideal off-centre parabolic dish and the final mirror shape. Additionally, slight stretching of the metallized plastic further adds to the accuracy of the match.

(b) The mirror is digitally tracked to the sun in such a way as to always focus the solar flux onto an external receiver.

The receiver incorporates four flux-misalignment sensors, positioned behind the collector along the flux-focus direction, supported from the collector by a mounting rod with perpendicular spars, equally distributed in an angular sense around the line of the rod. The function of these sensors is to provide feedback to the shell's drive systems as to the alignment of the mirror, and the data from these sensors is used to refine the performance of the tracking system.

(c) Four drive engines and drive contact regions are provided, designed so as to provide six independent degrees of controllable motion. The tracking system requires that the mirror's angular orientation be controlled over all three orthogonal spatial dimensions, and each dimension requires two directions of motion.

The drive engines are mounted on four flat plastic sheets attached to the toroid, which are wedge-shaped with a curved edge to match the curve of the toroid where they attach. The wedge ends of the sheets are to be made buoyant with floatation tanks so as to ensure a constant pressure between the sphere and the drive system.

(d) A number of differing drive units are possible (which are discussed below in more detail with reference to FIGS. 10–13).

The drive system when active flips a two-pronged paddle from the horizontal through the vertical to the reversed horizontal orientations. This brings it into contact with the shell, applies a small torque on the shell, which rotates the shell in a direction perpendicular to the collar base's radial line in the direction of the drive system in question. When a drive is not active, free rollers at either end of the paddle for that drive allow the shell to pass over the paddle with low frictional resistance.

Each major arm of the paddle incorporates a contra-rotation reduction gear system, so that the outer surface cylinder of the arm rotates in an opposite sense to the direction of rotation of the paddle, when the shell is in contact with the upper branch of the paddle. This ensures that fine positioning of the shell may be achieved, with minimal stress upon the surface of the shell. The contra-reduction is achieved with a standard epicyclic gearing.

Digital tracking algorithms calculate the current position of the sun, and from that deduce the required position of the mirror, given its designed bounce angle and the position of the fixed collector. The control system selects one of 6 possible rotation moves to apply to the shell, and activates the required engine pairs accordingly. Feedback from the four flux-misalignment sensors is used to provide fine position control to optimize the flux collected.

A fixed drive engine having only one degree of rotational freedom can be employed.

Four drive modules can be utilized. Each module includes two free-running drive rollers and a central drive roller which may either consist of one or two cylinders attached to the central cylinder by means of a metal drive shaft frame. Instead of three parallel central drive cylinders, it is also possible to use two cylinders, where the middle cylinder is larger than the shell contact cylinder. It is also possible to replace the cylinders with a contra-rotating reduction belt.

Other possible alternative embodiments that are expected to offer one or more advantages of the present invention are described with reference to the further accompanying drawings identified as follows. In these possible embodiments, like reference numerals refer to like features as described above with reference to FIGS. 1 and 2.

Figure 3:
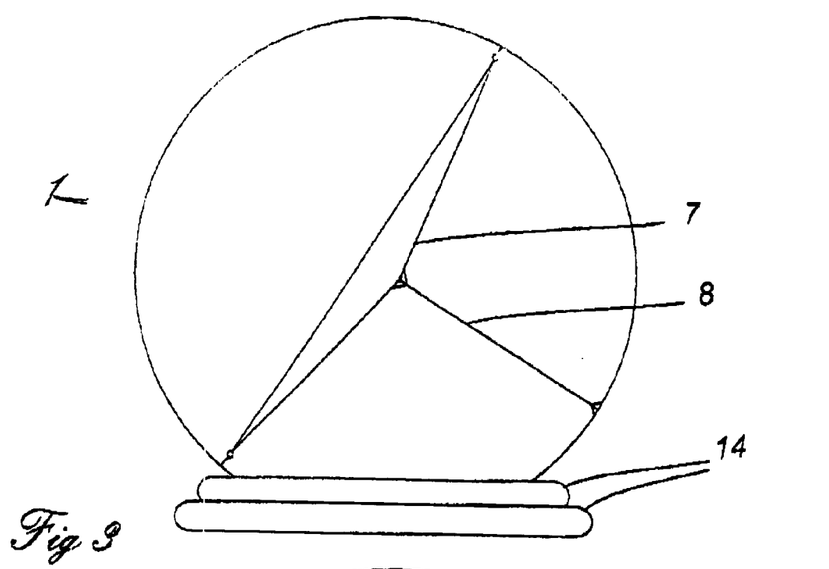
Figure 4:
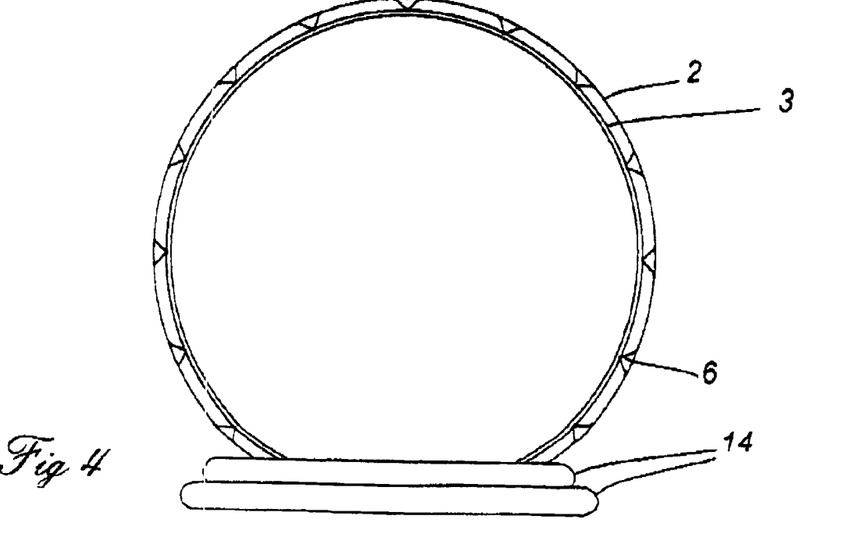

FIG. 3 is a first cross-sectional view of a second embodiment of a device of the present invention; and FIG. 4 is a second cross-sectional view of the device of FIG. 3, the sectional views being orthogonal to each other.

In FIGS. 3 and 4, there are illustrated two concentric toroids (14), one mounted on top of the other, with the upper toroid being of a smaller diameter than the lower toroid. Two toroids provide greater overall rigidity and are expected to have a specific use in higher ambient wind conditions.

Figure 5:
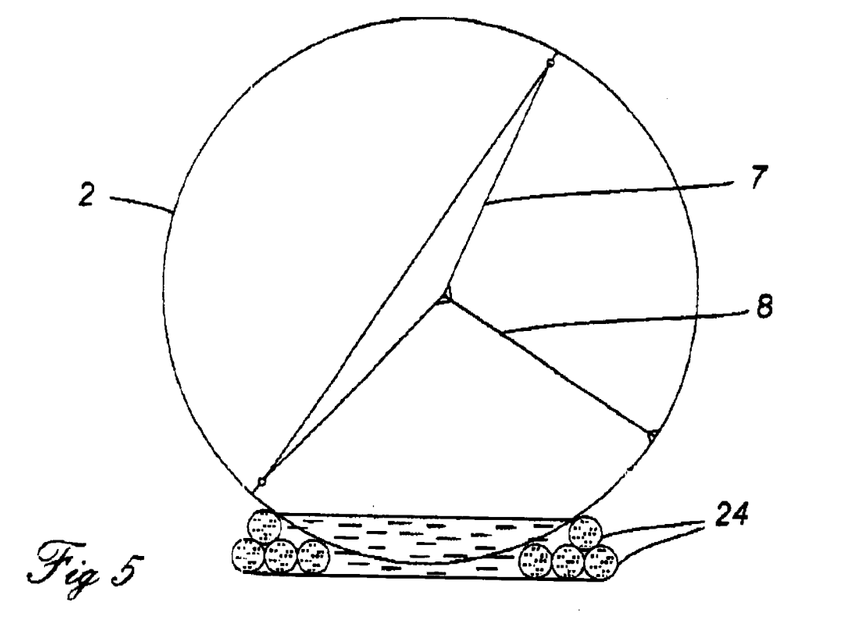

FIG. 5 is a cross-sectional view of a third embodiment of a device of the present invention.

In FIG. 5, there are illustrated four concentric toroids (24). Three lower toroids, each with a decreasing diameter, are nested together in a lateral plane. The fourth toroid is mounted on top of the three lower toroids, in the interstice between the outer toroid and the adjacent toroid. Once again, multiple toroids provide even greater overall rigidity.

Figure 6:
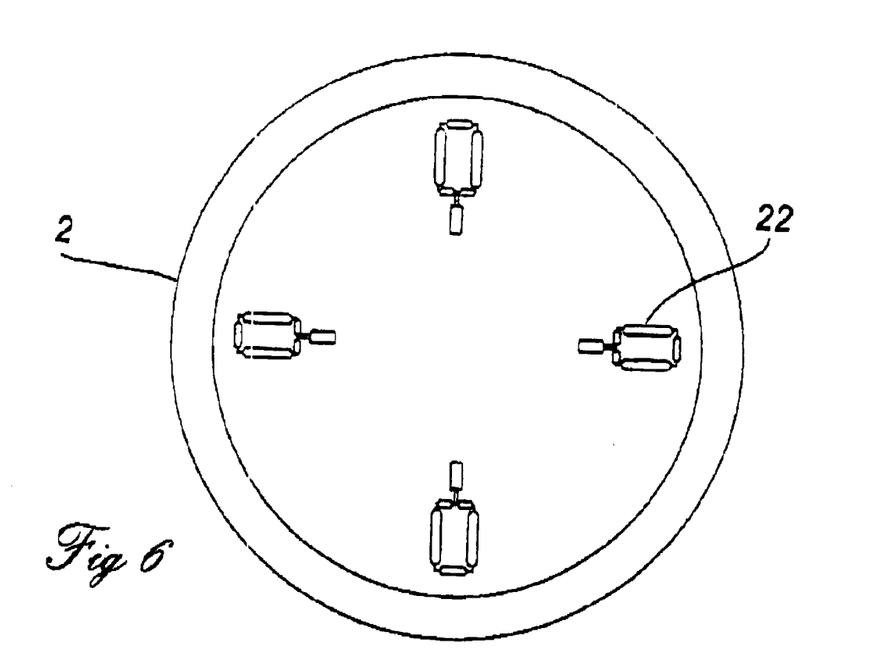

FIG. 6 is a plan view of a fourth embodiment of a device of the present invention.

FIG. 6 depicts a plan view of the device of FIGS. 1 and 2, further including rotating armature assemblies (22) in a radial formation which, in operation, contact the surface of the shell (2) and permit rotation thereof.

Figure 7:
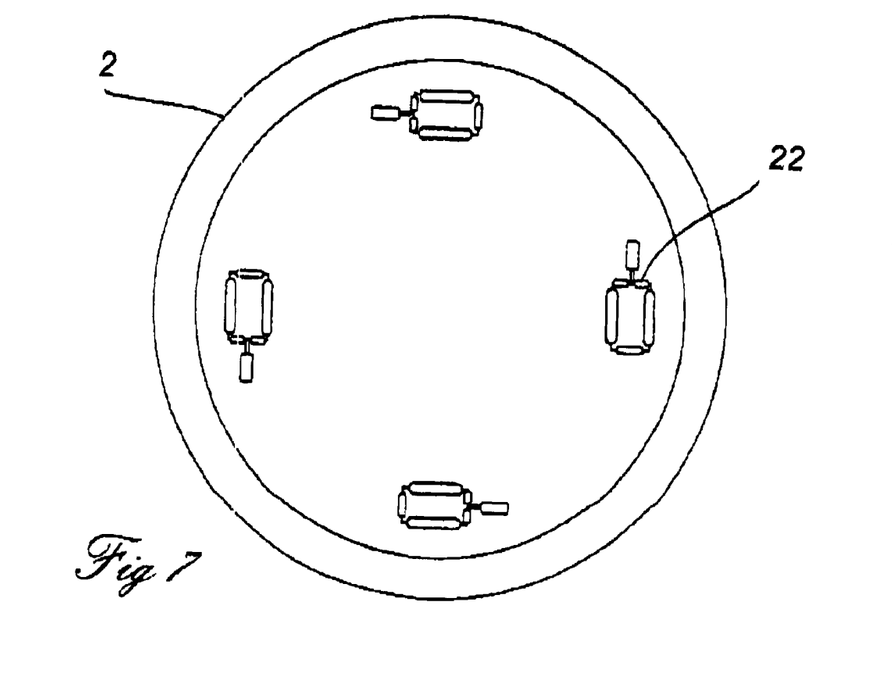

FIG. 7 is a plan view of a fifth embodiment of a device of the present invention.

FIG. 7 depicts a plan view of the device of FIGS. 1 and 2, further including rotating armature assemblies (22) in a tangential formation which, in operation, contact the surface of the shell (2) and permit rotation thereof.

Figure 8:
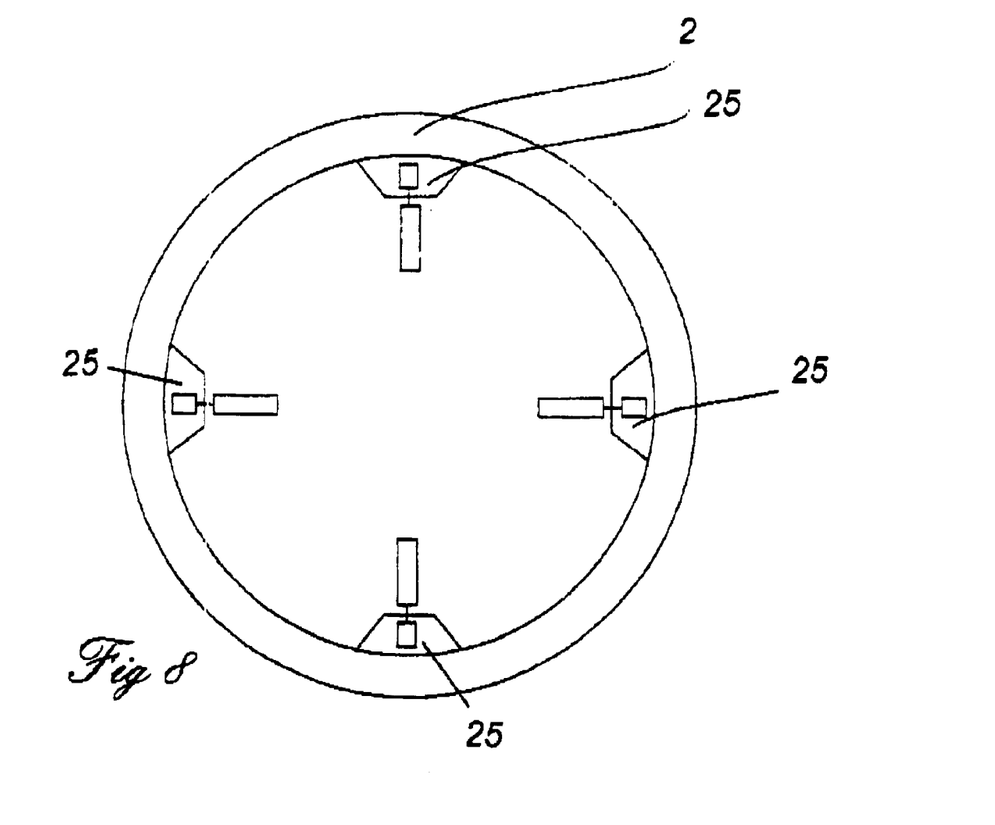

FIG. 8 is a plan view of a sixth embodiment of a device of the present invention.

FIG. 8 depicts cardinally and radially oriented mount plates and four drive units (25) attached to the device of the invention.

Figure 9:
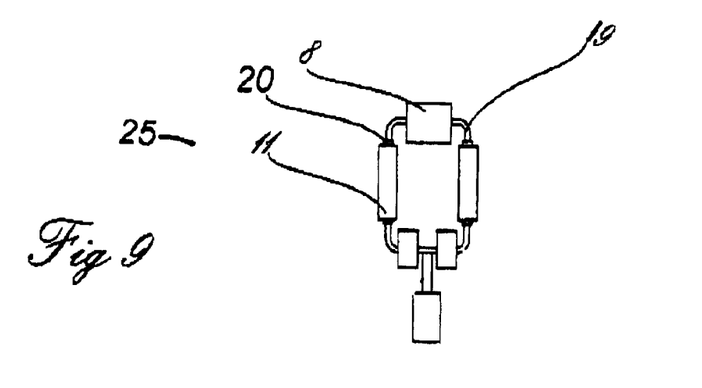

FIG. 9 is a schematic representation of a drive unit (25) illustrated in FIG. 8.

FIG. 9 depicts an epicyclic contra-reduction gearing (20) system represented as two small cylinders at the toroid-centre end of the unit. Each cylinder turns against the internal drive shaft according to the gearing ratios set by the reduction gears, located between the drive frame assembly (19) and the external cylinder (11).

Figure 10:
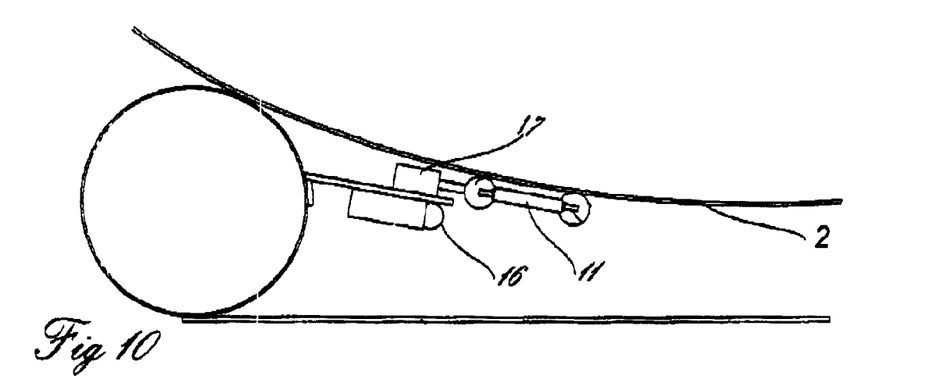

FIG. 10 depicts a first lateral view of a drive unit illustrated in FIG. 8.

The drive unit depicted in FIG. 10 has the drive inactive, with the free end rollers against the shell, enabling low-resistance transverse motion of the shell. Buoyancy in the rollers themselves and in a buoyancy tank beneath the plastic mount (16) ensure a constant pressure between the drive and the shell. The drive engine is located beneath the plastic mount. This is facilitated by a translation gear housing (7) fixed to the upper side of the plastic mount, above the engine, which serves to rotate the drive frame assembly.

Figure 11:
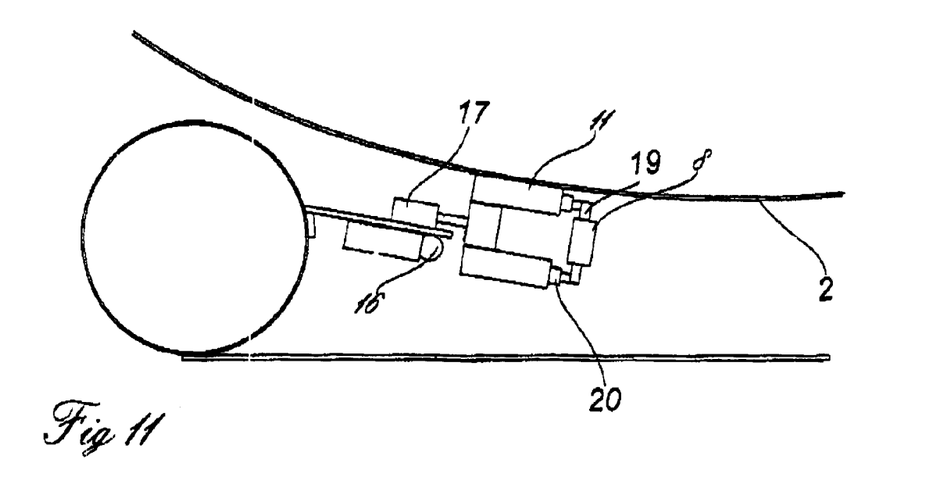

FIG. 11 depicts a second lateral view of a drive unit illustrated in FIG. 8.

The drive unit depicted in FIG. 11 has the drive activated and rotating the shell. As the drive turns, the epicyclic contra-reduction gears (20) are activated. The ensuing counter-rotation of the drive cylinder has the effect of producing a small change in the position of the shell, despite a relatively large change in the position of the drive system itself. The drive cylinders (11) have a rubber or any non-slip surface, enabling the cylinders to grip the shell.

Figure 12:
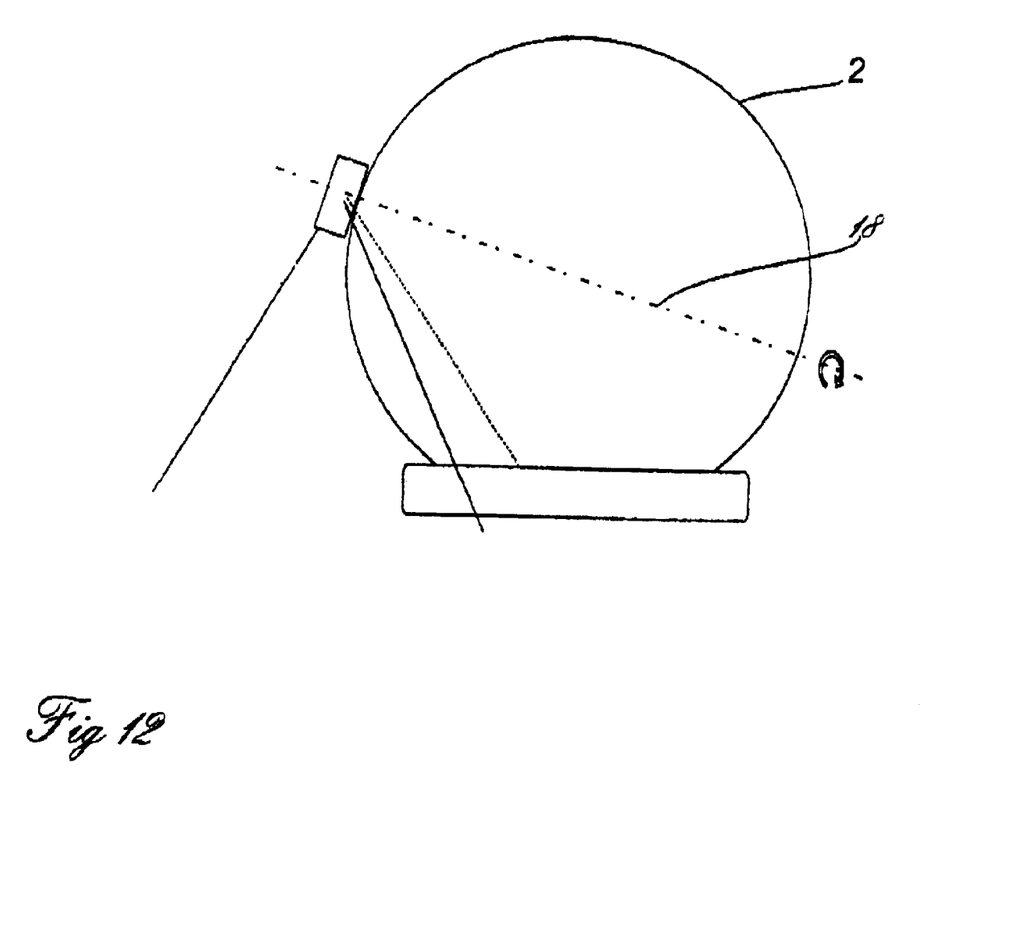

FIG. 12 depicts a first alternative drive unit for use with the device of the present invention.

The drive unit of FIG. 12 is a polar drive, with the polar drive axis (18) illustrated.

Figure 13:
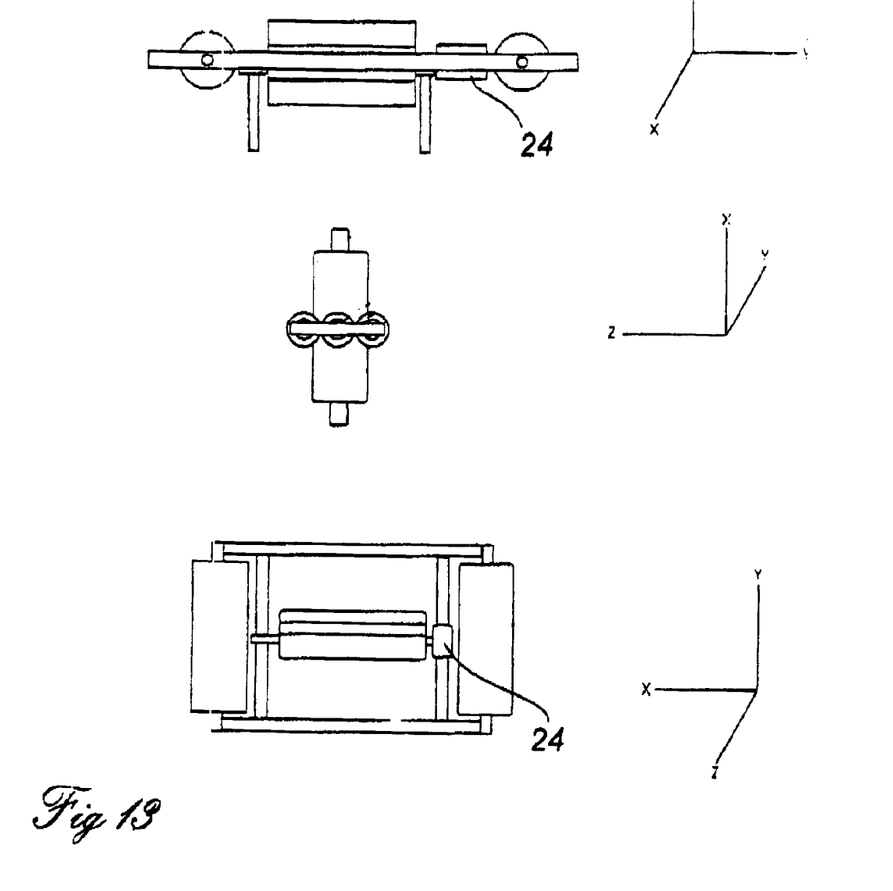

FIG. 13 depicts a second alternative drive unit for use with the device of the present invention.

The drive unit of FIG. 13 illustrates three orthogonal cross-sectional views of the drive unit which is fixed to the base of the toroid. At each end are free-running rollers to enable free transverse motion of the shell when the drive is inactive. When active, the drive engines (24) turn to lift the shell off the free-running rollers, and impart a small displacement to the shell.

The present invention can operate—singly or in multiples—terrestrially, in water, in the atmosphere or in space or edge-of-space deployment.

When said shells are to be deployed within large bodies of water, their motion must be constrained laterally. This may be achieved through the use of rigid boundaries placed underneath (which may be fixed relative to the earth or merely fixed relative to nearby boundaries), on or above the surface of the body of the water. The control systems may be attached to these boundaries, or may be mounted separately on the base of the body of water, or may possess their own internal buoyancy to maintain the desired level of contact with said shell.

When deployed at altitude within an atmosphere, said device(s) may adopt one or more of the following configurations:

1 each said shell may be locatable and orientable in the atmosphere by means of propulsion jets, or by mass redistribution by means of relocation of ballast directly within said shell, or by means of a fluid piping system, or by ailerons, or by mechanical engines attached to a controlling body;

2 the above control systems may apply to a set of said shells connected in a line by means of cables, rigid frameworks, membrane sheets or nets; they may also be joined through direct surface contact; the control may be individual to each said shell, or to the ensemble of said shells as a whole;

3 the above control systems may apply to a set of said shells connected in a two or three-dimensional structure by means of cables, rigid frameworks, membrane sheets or nets, or direct surface contact; the control may be individual to each said shell, or to the ensemble of said shells as a whole; close-packed said shells in two or three-dimensional structures may be used.

Concentrated flux from the thus-deployed device(s) may be harnessed internally, peripherally, or externally as desired. In the case of external flux collection, the collection device or target may be physically connected to the shell system, or may be detached from the shell system. If detached, the collection device may consist of a gas-filled dirigible upon which devices for energy generation, transmission, and chemical production and transmission are mounted. Chemicals or electrical energy generated may be transferred back to the shell network for operation and maintenance purposes. Electrical energy may be used to create an electromagnetic radiation beam for the transferal of energy to the surface of a planet. Maintenance of the system may be achieved through the use of dirigibles which are able to easily move around the shell network and any target structures.

The shell for high atmosphere, or space use, is usually devoid of internal ballast.

The present invention can thus serve a multiple of uses from microwave dish to a solar flux collector and can be used—singly or in multiples—terrestrially, in water, in the atmosphere or in space or edge-of-space deployment. The shell enjoys total rotational motility, can be fully steerable, whilst being constrained laterally and vertically. Due to this total rotational motility, the shell has the capability for self-cleaning, as its entire exterior and interior surfaces may be cleansed by rotation through, for example, the internal ballast and through any exterior liquid support held in, for example, the collar assembly. The mounting and support mechanisms require less material to fabricate than prior art mechanisms and thus offer financial economies in construction.

It will be appreciated that the above described embodiments are only exemplification of the various aspects of the present invention and that modifications and alterations can be made thereto without departing from the inventive concept as defined in the following claims.

What is claimed is:

1. A device suitable for mounting an apparatus, said apparatus configured to receive and/or transmit radiation flux, said device including:
   a fluid-impermeable shell configured to attach to said apparatus;
   a restraining means operatively connected to said shell to restrain said shell at a required position; and
   a support means operatively connected to said shell and configured to buoyantly support said shell and to allow continuous movement of said shell along at least one non-vertical axis;
   wherein said restraining means and said support means, in combination, are configured to allow rotational movement of said shell at said required position.

2. A device as defined in claim 1 wherein, said apparatus is selected from one or more of the group of a transmitting/receiving apparatus, a reflecting apparatus, and a lensing apparatus.

3. A device as defined in claim 2, wherein said apparatus is said reflecting apparatus.

4. A device as defined in claim 3, wherein said reflecting apparatus includes a thin membrane reflective mirror associated with a reflector.

5. A device as defined in claim 4, wherein said reflector is a reduced-pressure plenum of two membranes being peripherally conjoined and mounted within said shell.

6. A device as defined in claim 5, wherein the anterior membrane of said two membranes is mirrored and wherein the posterior membrane of said two membranes is connected centrally via a radial tensor attached to the inner surface of said shell.

7. A device as defined in claim 4, wherein said reflector is an increased-pressure plenum of two circular membranes being peripherally conjoined and attached internally to said shell.

8. A device as defined in claim 4, wherein said reflector is a thin-mirrored membrane hermetically dividing said shell permitting a pressure differential to be maintained by the use of a gas or compounds exhibiting appropriate partial pressures.

9. A device as defined in claim 1, wherein said shell is a shape selected from the group of spherical, spheroid, cylindrical, and cyindroid shapes.

10. A device as defined in claim 1, wherein said shell is transparent.

11. A device as defined in claim 1, wherein said shell is hollow.

12. A device as defined in claim 11, wherein said shell is pressurised.

13. A device as defined in claim 12, wherein the internal pressure of said shell is maintained by means from one or more of the group of an external gas supply and pressure control, gas-release vents activated when said internal pressure exceeds some specified threshold, chemical compounds present internally of said shell which exhibit required pressures, and gas containers positioned internally of said shell which release gas when said internal pressure drops below a fixed threshold.

14. A device as defined in claim 1, wherein said shell is restrained laterally by said restraining means.

15. A device as defined in claim 14, wherein said shell is further restrained vertically by said restraining means.

16. A device as defined in claim 15, wherein said restraining means restrains said shell vertically by ballast held internally of said shell.

17. A device as defined in claim 16, wherein said ballast is either a liquid or particulate matter.

18. A device as defined in claim 17, wherein said ballast is a liquid.

19. A device as defined in claim 18, wherein said liquid further includes an agent selected from the group of bacteriostatic and anti-fogging agents.

20. A device as defined in claim 17, wherein said ballast is particulate matter.

21. A device as defined in claim 20, wherein said particulate matter is a vibrating resonance-fluidised bed.

22. A device as defined in claim 1, wherein said support means is selected from the group of liquid and particulate matter.

23. A device as defined in claim 22, wherein said ballast is particulate matter.

24. A device as defined in claim 23, wherein said particulate matter is a vibrating resonance-fluidised bed.

25. A device as defined in claim 22, wherein said support means includes a collar assembly surrounding the lower portion of said shell, said collar assembly retaining said liquid or said particulate matter of said support means.

26. A device as defined in claim 25, wherein said collar assembly includes one or more toroids having a construction selected from the group of rigid and or flexible constructions.

27. A device as defined in claim 26, wherein said one or more toroids is of a flexible construction.

28. A device as defined in claim 27, wherein the rigidity necessary for use of said one or more toroids is achieved by either by inflating said one or more toroids with a gas to a sufficient pressure to resist compression by said shell in a given environment, or by filling with a liquid.

29. A device as defined in claim 28, wherein said rigidity achieved by said filling with liquid is further increased by supplying said one or more toroids with an elevated pressure head.

30. A device as defined in claim 25, wherein low friction materials are used to manufacture said collar assembly in the contact area with said shell.

31. A device as defined in claim 25, wherein jets of fluid are operated within the contact area with said shell to provide a film of fluid between said shell and said collar assembly.

32. A device as defined in claim 31, wherein said fluid is further directed to clean the exterior surface of said shell.

33. A device as defined in claim 25, wherein permeable membranes through which fluid is forced are positioned within the contact area with said shell to provide a film of fluid between said shell and said collar assembly.

34. A device as defined in claim 25, wherein said collar assembly is reinforced against lateral displacement.

35. A device as defined in claim 34, wherein said lateral displacement is prevented by the use of wedges.

36. A device as defined in claim 35, wherein said wedges are made of a rigid or semi-rigid material.

37. A device as defined in claim 36, wherein said wedges are made of a semi-rigid material.

38. A device as defined in claim 37, wherein said semi-rigid material is at least one rubber tyre.

39. A device as defined in claim 38, including two or more of said tyre surrounding said collar assembly.

40. A device as defined in claim 1, wherein said radiation flux is collected by a receiver assembly positioned internally or externally of said shell.

41. A device as defined in claim 40, wherein said radiation flux is collected by a receiver assembly positioned internally of said shell.

42. A device as defined in claim 41, wherein said receiver assembly is fixed or motile.

43. A device as defined in claim 40, wherein said receiver assembly is supported by said shell.

44. A device as defined in claim 40, wherein said receiver assembly includes a concentrator for said radiation flux, whereby said radiation flux is focused externally, peripherally or internally of said shell.

45. A device as defined in claim 44, wherein said concentrator is mounted internally of said shell.

46. A device as defined in claim 45, wherein said concentrator is a metallized or generally reflective plastic surface attached to the interior of said shell.

47. A device as defined in claim 45, wherein said concentrator includes apertures therein sufficient for any of said ballast held internally of said shell to pass through as said device moves.

48. A device as defined in claim 1, wherein said rotational movement of said device is undertaken by a steering method comprising an altitude/azimuth/Equation of Time algorithm interpreted to a suitable means for rotation of said device.

49. A device as defined in claim 1, wherein said device includes a second means to restrain said device in a required location.

50. A method for receiving and/or transmitting radiation flux, wherein said radiation flux is received and/or transmitted by a device as defined in claim 1.

* * * * *